United States Patent
Kuo et al.

(10) Patent No.: US 10,198,084 B2
(45) Date of Patent: Feb. 5, 2019

(54) GESTURE CONTROL DEVICE AND METHOD

(71) Applicant: HON HAI PRECISION INDUSTRY CO., LTD., New Taipei (TW)

(72) Inventors: Chin-Pin Kuo, New Taipei (TW);
Tung-Tso Tsai, New Taipei (TW);
Chih-Yuan Chuang, New Taipei (TW);
Chih-Te Lu, New Taipei (TW);
Jung-Hao Yang, New Taipei (TW);
Chien-Tsung Lee, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 309 days.

(21) Appl. No.: 15/153,751

(22) Filed: May 13, 2016

(65) Prior Publication Data
US 2017/0123501 A1 May 4, 2017

(30) Foreign Application Priority Data
Oct. 30, 2015 (TW) .............................. 104135721 A (51) Int. Cl.
| | |
|---|---|
| *G06F 3/01* | (2006.01) |
| *G06F 3/00* | (2006.01) |
| *G06K 9/00* | (2006.01) |
| *G06T 7/00* | (2017.01) |
| *G06K 9/46* | (2006.01) |

(52) U.S. Cl.
CPC .............. *G06F 3/017* (2013.01); *G06F 3/005* (2013.01); *G06K 9/00355* (2013.01); *G06K 9/4604* (2013.01); *G06T 7/0044* (2013.01); *G06T 2207/10028* (2013.01); *G06T 2207/30196* (2013.01)

(58) Field of Classification Search
CPC combination set(s) only.
See application file for complete search history.

(56) References Cited

U.S. PATENT DOCUMENTS

| | | | | |
|---|---|---|---|---|
| 6,147,678 A | * | 11/2000 | Kumar | .................... G06F 3/017 |
| | | | | 345/156 |
| 2015/0062003 A1 | * | 3/2015 | Rafii | ....................... G06F 3/017 |
| | | | | 345/156 |

OTHER PUBLICATIONS

ZhenZhong Li, YuanXiang Zhang, ZhiHeng Li, A Fingertip Detection and Interaction System Based on Stereo Vision, Oct. 11, 2011, pp. 2-9, Taiwan.

* cited by examiner

*Primary Examiner* — Jennifer Mehmood
*Assistant Examiner* — Deeprose Subedi
(74) *Attorney, Agent, or Firm* — ScienBiziP, P.C.

(57) ABSTRACT

A gesture control method is provided. The method includes: obtaining gesture images with depth information; creating a coordinate system; determining coordinates of a center of each camera, a start position and an end position of the gesture; calculating directions and values of a first angle defined from an axle through the end position to a line connecting between the start position and the end position and at least two second angles each defined a vertical axle through a center of a camera to a line connecting the center of the camera and the start position, each second angle corresponding to a camera of an electronic device; and determining an electronic device to be a controlled device, wherein the electronic device corresponds to a second angle in a same direction with the first angle having a minimum absolute difference with the first angle.

18 Claims, 5 Drawing Sheets

GESTURE CONTROL DEVICE AND METHOD

FIELD

The subject matter herein generally relates to a gesture control method and a gesture control device.

BACKGROUND

Some electronic devices, for example, televisions, air conditioners, video displayers, can be controlled by all kinds of commands including gestures or voice. However, if there exists two or more electronic devices which can be controlled by gestures, a gesture control command may activate corresponding function of one or more electronic device.

BRIEF DESCRIPTION OF THE DRAWINGS

Implementations of the present technology will now be described, by way of example only, with reference to the attached figures.

DETAILED DESCRIPTION

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

A definition that applies throughout this disclosure will now be presented.

The term "comprising," when utilized, means "including, but not necessarily limited to"; it specifically indicates open-ended inclusion or membership in the so-described combination, group, series and the like.

Figure 1:
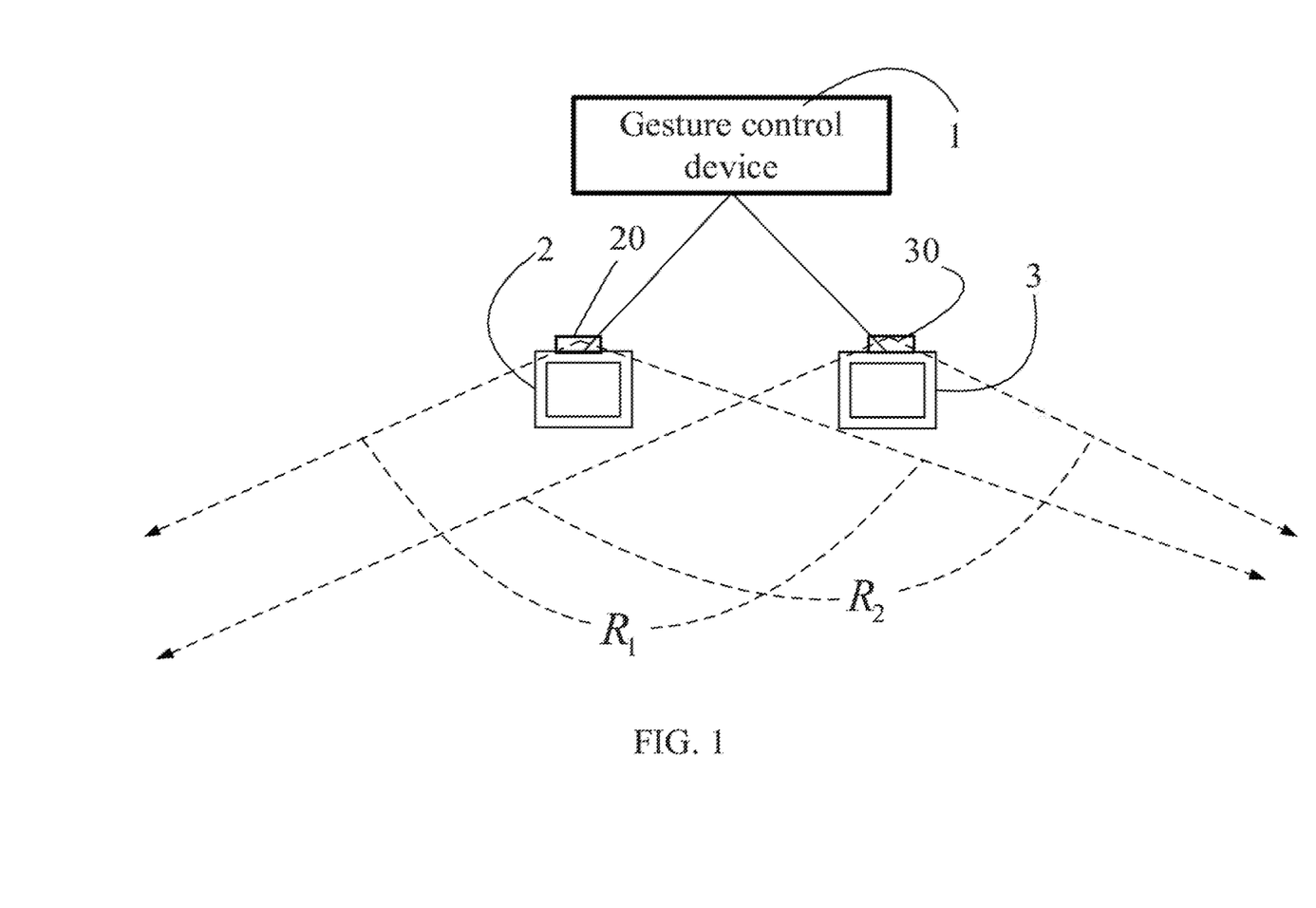
FIG. 1 is a diagrammatic view of an exemplary embodiment of work environment of a gesture control device.

FIG. 1 illustrates a diagrammatic view of an exemplary embodiment of work environment of a gesture control device 1. In the exemplary embodiment, a plurality of electronic devices (for example, first electronic device 2 and second electronic device 3) can be coupled to the gesture control device 1 through wireless or wired connections. The plurality of electronic devices can be televisions, air conditioners, video displayers, monitors, computers, or any other electronic devices which can be controlled by gestures. Each of the plurality of electronic devices can include a camera. In order for ease of description, only the first electronic device 2 and the second electronic device 3 are illustrated. In at least one embodiment, the number of the electronic devices can be 3, 4, 5 or any suitable number.

The first electronic device 2 and the second electronic device 3 respectively can include a first camera 20 and a second camera 30. The first camera 20 and the second camera 30 can be a depth camera and can be configured to take gesture images within a covering range (for example, the first range $R_1$ and the second range $R_2$. The first electronic device 2 and the second electronic device 3 can be controlled based on the gesture images.

The gesture control device 1 can be an independent server, a part of the first/second electronic device 2/3, or an electronic device communicating with the first/second electronic device 2/3, for example, STB (Set Top Box).

Figure 2:
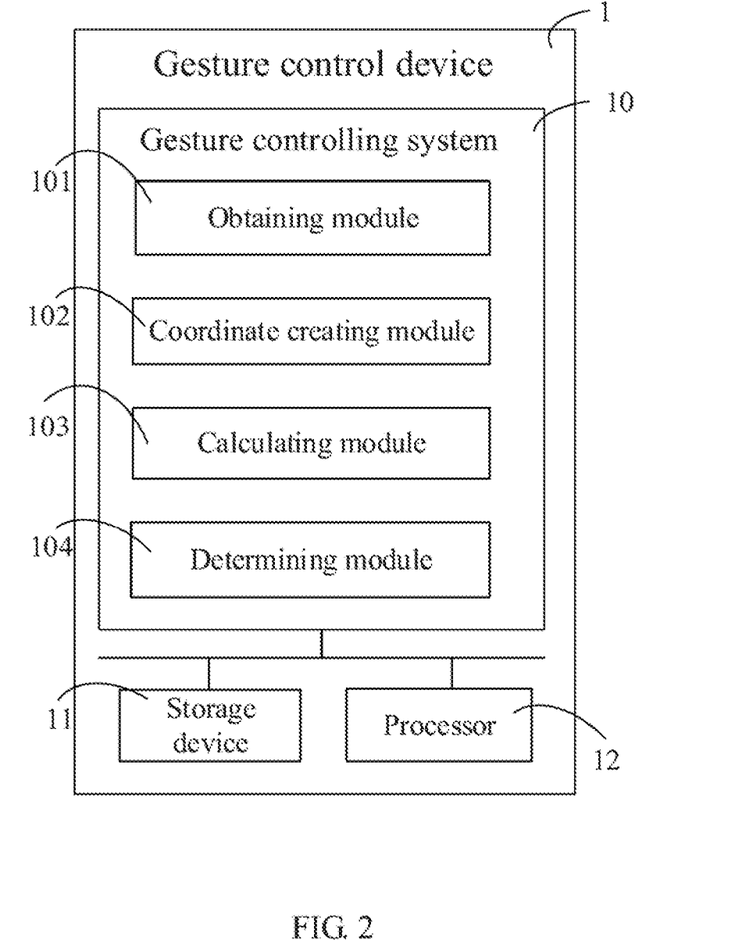
FIG. 2 is a block diagram of an exemplary embodiment of a gesture control device.

FIG. 2 illustrates a block diagram of an exemplary embodiment of a gesture control device 1.

The gesture control device 1 can include, but is not limited to, a storage device 11 and a processor 12. The processor 12 can be a central processing unit (CPU), a microprocessor, or other data processor chip that performs functions of the gesture control device 1. The storage device 11 can be an internal storage unit of the gesture control device 1, for example, a hard disk or memory, or a pluggable memory, for example, Smart Media Card, Secure Digital Card, Flash Card. In at least one embodiment, the storage device 11 can include two or more storage devices such that one storage device is an internal storage unit and the other storage device is a removable memory.

A gesture controlling system 10 can include computerized instructions in the form of one or more programs that can be executed by the processor 12. In the embodiment, the gesture controlling system 10 can be integrated in the processor 12. In at least one embodiment, the gesture controlling system 10 can be independent from the processor 12 and can be stored in the storage unit 11 and coupled to the processor 12. The system 10 can include one or more modules, for example, an obtaining module 101, a coordinate creating module 102, a calculating module 103, and a determining module 104. A "module," as used herein, refers to logic embodied in hardware or firmware, or to a collection of software instructions, written in a programming language, such as, JAVA, C, or assembly. One or more software instructions in the modules may be embedded in firmware, such as in an EPROM. The modules described herein may be implemented as either software and/or hardware modules and may be stored in any type of non-transitory computer-readable medium or other storage device. Some non-limiting examples of non-transitory computer-readable medium include CDs, DVDs, BLU-RAY, flash memory, and hard disk drives.

The obtaining module 101 can be configured to obtain gesture images with depth information taken by the first/second camera 20/30. At least one embodiment, the first/second camera 20/30 can take gesture images when gestures goes into the covering range of the first/second camera 20/30. The gesture images can include a plurality of gesture images, based on which motion path of the gestures can be determined.

The a coordinate creating module 102 can be configured to create a coordinate based on the gesture images and calculate coordinates of a vertical axle of the first/second camera 20/30, coordinates of a center of the first/second camera 20/30. The depth information can be taken as Z axis, and plane coordinates in the gesture images can be taken as X axis and Y axis. The coordinate creating module 102 further can be configured to calculate coordinates of a start position S of the gesture and coordinates of an end position E of the gesture. The start position S and the end position E can be respectively where a predetermined portion of a hand, for example, a terminal of a finger, is located when the gesture starts and ends. When the predetermined portion ends at a position and remains still for a predetermined interval, for example, 1 second, 1.5 second or any other suitable interval, the position can be determined as the end position E.

Figure 3:
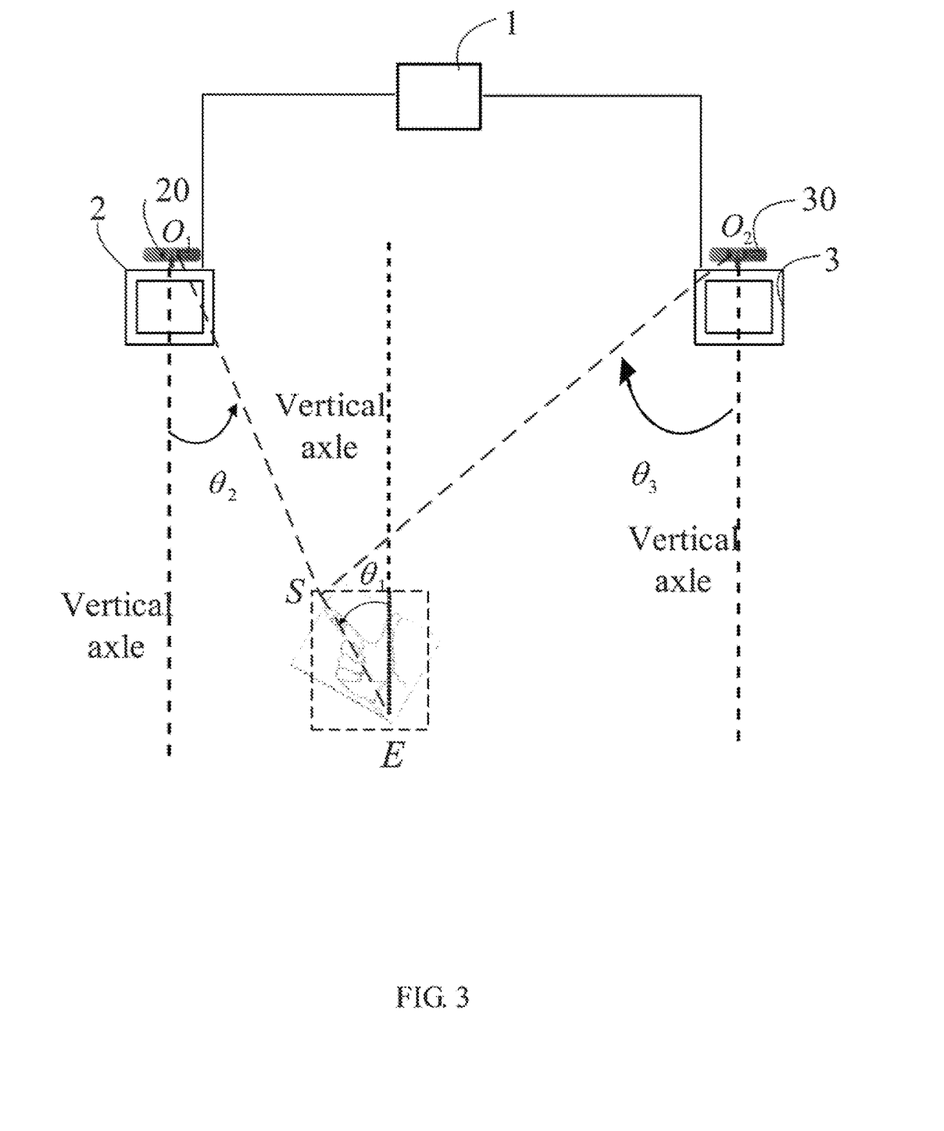
FIG. 3 is a diagrammatic view of an exemplary embodiment of determining a controlled device.
Figure 4:
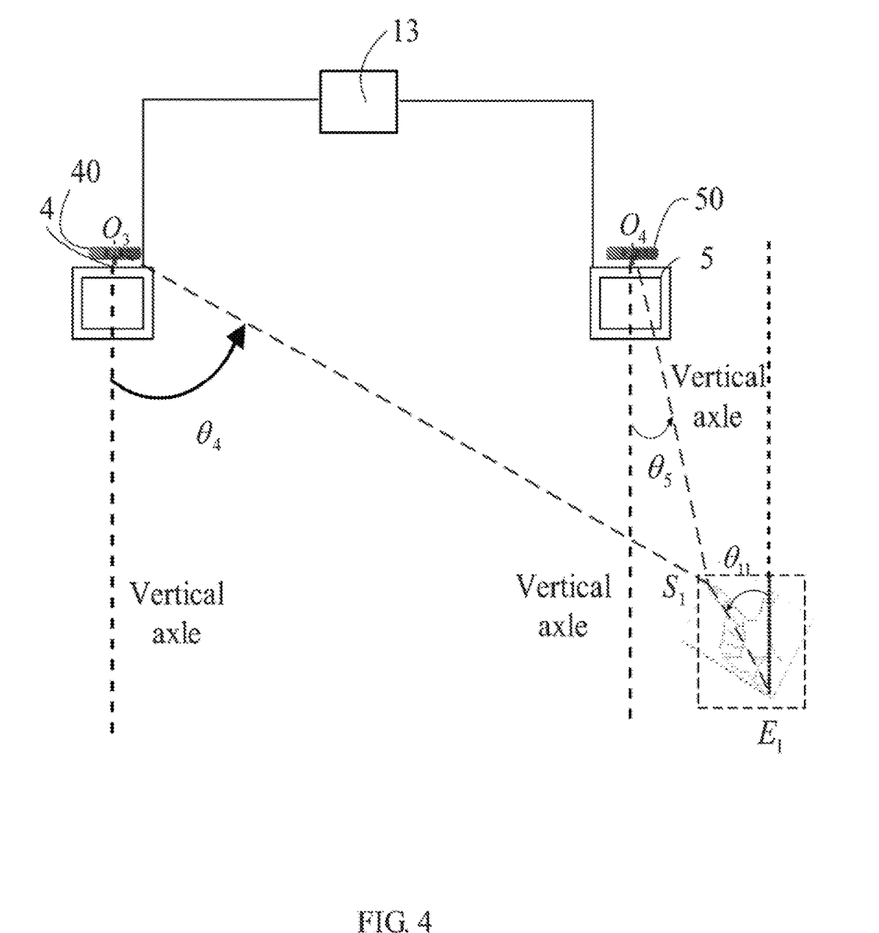
FIG. 4 is a diagrammatic view of another exemplary embodiment of determining a controlled device.

The calculating module 103 can be configured to calculate a first angle from a vertical axle through the end position E to a line connecting between the start position S and the end position E, for example, the angel $\theta_1$ shown in FIG. 3 and the angle $\theta_{11}$ shown in FIG. 4. The calculating module 104 further can be configured to calculate a second angle from a vertical axle through a center of one of the first and second cameras 20, 30 to a line connecting between the start position S to the center of the one of the first and second cameras 20, 30, for example, $\theta_2$, $\theta_3$ shown in FIG. 3 and $\theta_4$, $\theta_5$ shown in FIG. 4.

The determining module 104 can be configured to determine one of the first/second electronic device as a controlled device based on the first angle and the second angles.

As illustrated in FIG. 3, the gesture control device 1 can be coupled with the first electronic device 2 and the second electronic device 3 respectively. The first electronic device 2 and the second electronic device 3 respectively include a first camera 20 and a second camera 30. The first camera has 20 a center $O_1$ and the second camera 30 has a center $O_2$. When gestures goes into the covering range of the first camera 20 and the second camera 30, the first camera 20 and the second camera 30 take gesture images of the gestures. The coordinate creating module 102 of the gesture control device 1 creates a coordinate system taking the depth information as Z axis and taking coordinates of plane coordinates in the gesture images as X axis and Y axis. Then the coordinate creating module 102 determines coordinates of the centers $O_1$ and $O_2$ of the first camera 20 and the second camera 30, the start position S and the end position E. The calculating module 103 determines direction vectors of the vertical axles through the centers $O_1$ and $O_2$ and the line connecting the start position S and the end position E and the lines respectively connecting the center $O_1$ and $O_2$ and the end position E. If coordinates of the center $O_1$ are $(x_0, y_0, 0)$, coordinates of the start position S are $(x_1, y_1, z_1)$, coordinates of the end position E are $(x_2, y_2, z_2)$, the direction vector of the line connecting the start position S and the end position E is $((x_2-x_1), (y_2-y_1), (z_2-z_1))$, and the direction vector of the line connecting the center $O_1$ and the start position S is $((x_1-x_0), (y_1-y_0), z_1)$, the direction vector of the vertical axle through the center $O_1$ is $(0, 0, 1)$, and the direction vector of the vertical axle through the end position E is $(0, 0, 1)$.

The first angle and the second angle can be determined based on the direction vectors. An angle between two lines can be determined according to a Formulae: Cos $A=V_1 \cdot V_2/(|V_1|*|V_2|)$, wherein $V_1$, $V_2$ represented respectively direction vectors of the two lines, $V_1=(a_1, b_1, c_1)$, $V_2=(a_2, b_2, c_2)$, $V_1 \cdot V_2=(a_1, b_1, c_1) \cdot (a_2, b_2, c_2)=a_1*a_2+b_1*b_2+c_1*c_2$, $|V_1|=|(a_1, b_1, c_1)|=\sqrt{(a_1^2+b_1^2+c_1^2)}$, $|V_2|=|(a_2, b_2, c_2)|=\sqrt{(a_2^2+b_2^2+c_2^2)}$. According to the formulae and the direction vectors calculated by the coordinate creating module 102, the first angle $\theta_1$ and the second angle $\theta_2$ can be determined as follows: cos $\theta_1=((x_2-x_1), (y_2-y_1), (z_2-z_1)) \cdot (0, 0, 1)/(|((x_2-x_1), (y_2-y_1), (z_2-z_1))|*|(0, 0, 1)|)$, wherein $|((x_2-x_1), (y_2-y_1), (z_2-z_1))|=\sqrt{(x_2-x_1)^2+(y_2-y_1)^2+(z_2-z_1)^2}$, $|(0, 0, 1)|=\sqrt{0^2+0^2+1^2}=1$ cos $\theta_2=((x_1-x_0), (y_1-y_0), (z_1-z_0)) \cdot (0, 0, 1)/(|((x_1-x_0), (y_1-y_0), (z_1-z_0))|*|(0, 0, 1)|)$, wherein $|((x_1-x_0), (y_1-y_0), (z_1-z_0))|=\sqrt{(x_1-x_0)^2+(y_1-y_0)^2+(z_1-z_0)^2}$, $|(0, 0, 1)|=\sqrt{0^2+0^2+1^2}=1$.

Other second angles, for example $\theta_3$ illustrated in FIG. 3, can be determined in a same way with the second angle $\theta_2$.

The calculating module 103 determines directions of the first angle and the second angel. As illustrated in FIG. 3, the first angle $\theta_1$ is the angle from the vertical axle through the end position E to the line connecting the start position S and the end position E. Since a coordinate value of the end position E in X axis is larger than that of the start position S, the direction of the first angle $\theta_1$ is anticlockwise. In a similar way, since a coordinate value of the start position S in X axis is larger than that of the center $O_1$, the direction of the second angle $\theta_2$ is anticlockwise. Since a coordinate value of the start position S in X axis is smaller than that of the center $O_2$, the direction of the second angle $\theta_3$ is clockwise.

As illustrated in FIG. 4, since a coordinate value of the end position $E_1$ in X axis is larger than that of the start position $S_1$, the direction of the first angle $\theta_{11}$ is anticlockwise. Since a coordinate value of the start position $S_1$ in X axis is larger than that of the center $O_3$, the direction of the first angle $\theta_4$ is anticlockwise. Since a coordinate value of the start position $S_1$ in X axis is larger than that of the center $O_4$, the direction of the first angle $\theta_5$ is anticlockwise.

Figure 5:
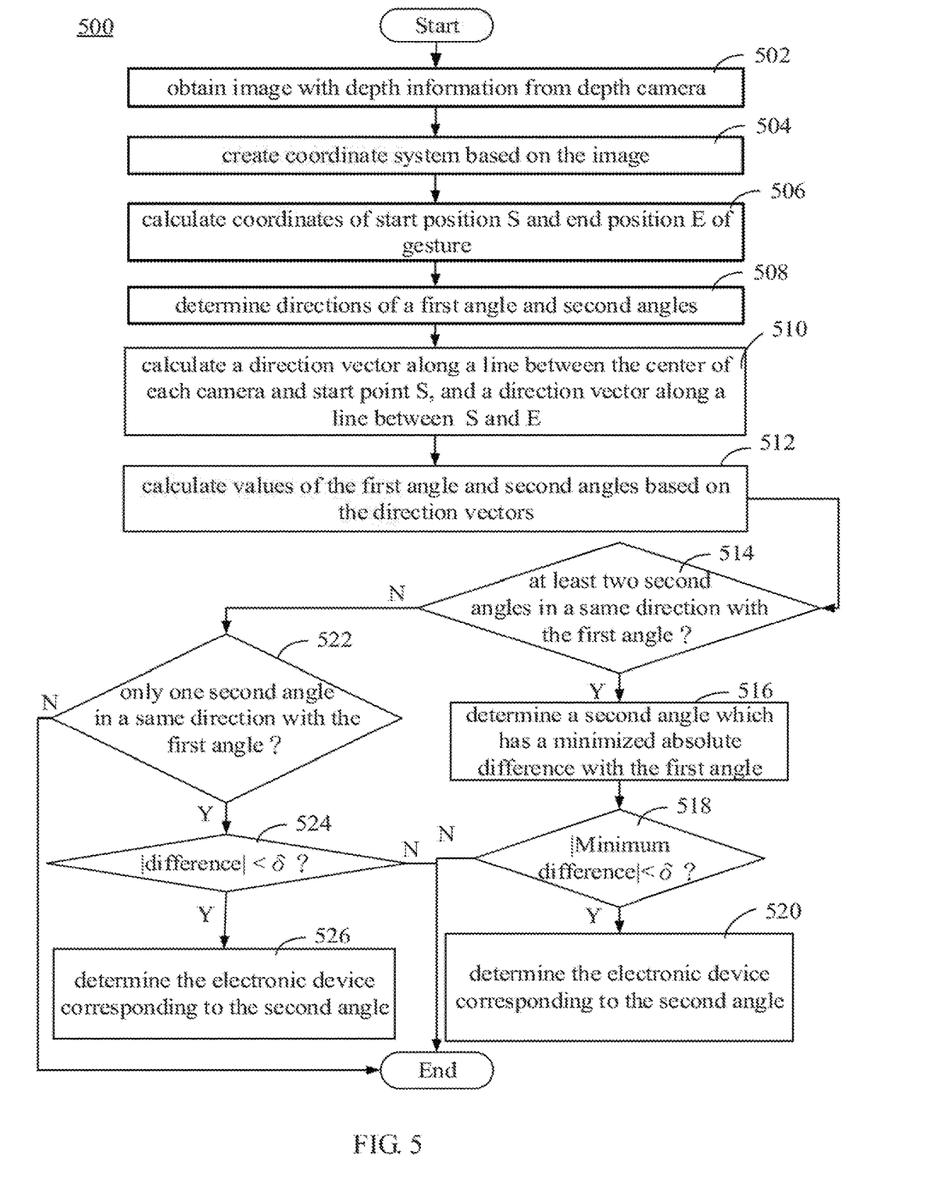
FIG. 5 is a flow chart of an exemplary embodiment of a gesture control method.

FIG. 5 illustrates a flowchart of an exemplary embodiment of a gesture control method 500 performed by a gesture control device. The example method 500 is provided by way of example, as there are a variety of ways to carry out the method. The method 500 described below can be carried out using the configurations illustrated in FIGS. 1-4, for example, and various elements of the figure is referenced in explaining example method 500. Each block shown in FIG. 5 represents one or more processes, methods or subroutines, carried out in the exemplary method 500. Furthermore, the illustrated order of blocks is by example only and the order of the blocks can change according to the present disclosure. Additional blocks may be added or fewer blocks may be utilized, without departing from this disclosure. The exemplary method 500 can begin at block 502.

At block 502, the gesture control device obtains gesture images with depth information from each camera. There can be two or more cameras are coupled with the gesture control device, each camera having a center. The gesture images can include a plurality of images based on which a start position and an end position of the gesture can be determined. The gesture included in the gesture images can start at a start position S and ends at an end position E. The start position S and the end position E can be determined based on a predefined portion of a hand, for example, a distal end of a finger of the hand, a geometric center of the hand, or any other suitable portion of the hand. The start position S can be where the predefined portion of the hand locates when the hand starts to move and the end position E can be where the predefined portion of the hand locates when the hand stops moving.

At block 504, the gesture control device creates a coordinate system for each camera which taking the depth information of the gesture images as Z axis and coordinates in the plane coordinates system in the gesture images as X axis and Y axis. Each camera can correspond to a coordinate system. In order for ease of description, the following blocks can take a first camera 20 illustrated in FIG. 3 for detail illustration of how to calculate a first angle $\theta_1$ and a second angle $\theta_2$. As illustrated in FIG. 3, the first angle $\theta_1$ is the angle from the vertical axle through the end position E to the line connecting the start position S and the end position E, and the second angle $\theta_2$ is the angle from the vertical axle through the center $O_1$ to the line connecting the start position S and the center $O_1$. The coordinates of the center $O_1$ of the camera 20 can be set as $(x_0, y_0, z_0)$, the direction vector of the vertical axle passing through the center $O_1$ can be $(0, 0, 1)$.

At block 506, the gesture control device determines coordinates of the start position and the end position of the gesture. The coordinates of the start position S can be $(x_1, y_1, z_1)$, and the coordinates of the end position E can be $(x_2, y_2, z_2)$.

At block 508, the gesture control device determines directions of the first angle and the second angle. Since a coordinate value of the end position E in X axis is larger than that of the start position S, the direction of the first angle $\theta_1$ is anticlockwise. In a similar way, since a coordinate value of the start position S in X axis is larger than that of the center $O_1$, the direction of the second angle $\theta_2$ is anticlockwise. Since a coordinate value of the start position S in X axis is smaller than that of the center $O_2$, the direction of the second angle $\theta_3$ is clockwise. The second angle $\theta_3$ is the angle from the vertical axle through the center $O_2$ of the second camera 3 to the line connecting the start position S and the center $O_2$.

At block 510, the gesture control device determines direction vectors of the line connecting between the center of the camera and the start position S, the line connecting between the start position S and the end position E, and a vertical axle through the center of the end position E. The direction vector of the line connecting the start position S and the end position E is $((x_2-x_1), (y_2-y_1), (z_2-z_1))$, and the direction vector of the line connecting the center $O_1$ and the start position S is $((x_1-x_0), (y_1-y_0), z_1)$, and the direction vector of the vertical axle through the end position E is $(0, 0, 1)$.

At block 512, the gesture control device calculates values of the first angle and the second angle based on the direction vectors. An angle between two lines can be determined according to a Formulae: $\cos A = V_1 \cdot V_2 / (|V_1|*|V_2|)$, wherein $V_1, V_2$ represent respectively direction vectors of the two lines, $V_1 = (a_1, b_1, c_1)$, $V_2 = (a_2, b_2, c_2)$, $V_1 \cdot V_2 = (a_1, b_1, c_1) \cdot (a_2, b_2, c_2) = a_1*a_2 + b_1*b_2 + c_1*c_2$, $|V_1| = |(a_1, b_1, c_1)| = \sqrt{(a_1^2 + b_1^2 + c_1^2)}$, $|V_2| = |(a_2, b_2, c_2)| = \sqrt{(a_2^2 + b_2^2 + c_2^2)}$. According to the formulae and the direction vectors calculated by the coordinate creating module 102, the first angle $\theta_1$ and the second angle $\theta_2$ can be determined as follows: $\cos \theta_1 = ((x_2-x_1), (y_2-y_1), (z_2-z_1)) \cdot (0, 0, 1)/(|((x_2-x_1), (y_2-y_1), (z_2-z_1))|*|(0, 0, 1)|)$ wherein $|((x_2-x_1), (y_2-y_1), (z_2-z_1))| = \sqrt{(x_2-x_1)^2 + (y_2-y_1)^2 + (z_2-z_1)^2}$, $|(0, 0, 1)| = \sqrt{0^2 + 0^2 + 1^2} = 1$ $\cos \theta_2 = ((x_1-x_0), (y_1-y_0), (z_1-z_0)) \cdot (0, 0, 1)/(|((x_1-x_0), (y_1-y_0), (z_1-z_0))|*|(0, 0, 1)|)$, wherein $|((x_1-x_0), (y_1-y_0), (z_1-z_0))| = \sqrt{(x_1-x_0)^2 + (y_1-y_0)^2 + (z_1-z_0)^2}$, $|(0, 0, 1)| = \sqrt{0^2 + 0^2 + 1^2} = 1$.

Values and directions of other second angles, for example $\theta_3$ illustrated in FIG. 3, can be determined in a same way with the second angle $\theta_2$.

At block 514, the gesture control device determines whether there are at least two second angles having a same direction with the first angle. If there are at least two second angles having the same direction with the first angle, the process goes into block 516, otherwise, the process goes into block 522.

At block 516, the gesture control device determines a second angle which has a minimum absolute difference with the first angle. The gesture control device calculates absolute differences between each second angle with the first angle and compares between each two absolute differences to determine the minimum absolute difference.

At block 518, the gesture control device determines whether the minimum absolute difference is less than a predefined tolerance $\delta$. If the minimum absolute difference is less than the predefined tolerance $\delta$, the process goes into block 520, otherwise, the process goes to the end.

At block 520, the gesture control device determines the second electronic device corresponds to the minimum absolute difference to be the controlled device by the gesture. For example, in FIG. 3, if the second angle $\theta_2$ has the minimum absolute difference with the first angle $\theta_1$, then the first electronic device 2 is determined to be the controlled device. That is, the gesture can control operations of the first electronic device 2, while the gesture cannot control operations of the second electronic device 3.

At block 522, the gesture control device determines whether there is a second angle having a same direction with the first angle. If there is a second angle having a same direction with the first angle, the process goes into block 524, otherwise, the process goes to the end.

At block 524, the gesture control device determines whether an absolute difference between the second angle having the same direction with the first angle and the first angle is less than the predefined tolerance $\delta$. If the absolute difference is less than the predefined tolerance $\delta$, the process goes into block 526, otherwise, the process goes to the end.

At block 526, the gesture control device determines the electronic device corresponds to the second angle having the same direction with the first angle to be the controlled device by the gesture.

The embodiments shown and described above are only examples. Even though numerous characteristics and advantages of the present technology have been set forth in the foregoing description, together with details of the structure and function of the present disclosure, the disclosure is illustrative only, and changes may be made in the detail, including in matters of shape, size and arrangement of the parts within the principles of the present disclosure up to, and including, the full extent established by the broad general meaning of the terms used in the claims.

What is claimed is:

1. A gesture control method, comprising:
   obtaining, from at least two cameras, gesture images with depth information, each camera being positioned at an electronic device;
   creating, by a gesture control device, a coordinate system which takes depth information as Z axis and coordinates in the plane coordinates system of the gesture images as X axis and Y axis;
   determining, by the gesture control device, coordinates of a center of each camera, a start position and an end position of the gesture included in the gesture images;
   calculating, by the gesture control device, directions and values of a first angle and at least two second angles, wherein the first angle is an angle from an axle through the end position to a line connecting between the start position and the end position, and each second angle is an angle from a vertical axle through a center of one of the cameras to a line connecting between the center of the one of the cameras and the start position, each second angle corresponding to one of the cameras and an electronic device on which the one of the cameras is located;

determining, by the gesture control device, an electronic device to be a controlled device by the gesture, wherein the electronic device corresponds to a second angle which has a same direction with the first angle and has a minimum absolute difference with the first angle;

determining, at the gesture control device, whether there is only one second angle in a same direction with the first angle; and when there is only one second angle in a same direction with the first angle, the gesture control device determining, the electronic device corresponding to the second angle in a same direction with the first angle, is the controlled electronic device.

2. The method of claim 1, wherein the direction of the first angle is based on the coordinates of the start position and the end position on the X axis: when the coordinates of the start position on the X axis is greater than that of the end position, the direction of the first angle is clockwise, while the coordinates of the start position on the X axis is less than that of the end position, the direction of the first angle is anticlockwise.

3. The method of claim 1, wherein the direction of the first angle is based on the coordinates of the center of each camera and the start position on the X axis: when the coordinates of the start position on the X axis is greater than that of the center of the camera, the direction of the second angle is clockwise, while the coordinates of the start position on the X axis is less than that of the center of the camera, the direction of the second angle is anticlockwise.

4. The method of claim 1, wherein values of the first angle and the second angles are based on direction vectors of lines defining the first angle and the second angles.

5. The method of claim 4, wherein when the coordinates of two points are respectively $(x_1, y_1, z_1)$, $(x_2, y_2, z_2)$, the direction vector of a line connecting the two points is $((x_2-x_1), (y_2-y_1), (z_2-z_1))$.

6. The method of claim 5, wherein when the angle defined by two lines is A, the direction vectors of the two lines are respectively $V_1$, $V_2$, $V_1=(a_1, b_1, c_1)$, $V_2=(a_2, b_2, c_2)$, and the angle A satisfies: $\cos A = V_1 \cdot V_2 / (|V_1|*|V_2|)$.

7. The method of claim 1, further comprising:
the gesture control device calculating an absolute difference between the first angle and the second angle;
the gesture control device determining whether the calculated absolute difference is less than a predefined tolerance; and
when the absolute difference is less than the predefined tolerance, the gesture control device determining whether the electronic device corresponding to the second angle in a same direction with the first angle is the controlled electronic device.

8. The method of claim 1, further comprising:
the gesture control device determining whether there are at least two second angles are in a same direction with the first angle;
when there are at least two second angles are in a same direction with the first angle, the gesture control device calculating absolute differences between each second angle in a same direction with the first angle and the first angle;
the gesture control device determining a minimum absolute difference by comparing the calculated absolute differences; and the gesture control device determining the electronic device corresponding to the second angle which has the minimum absolute difference with the first angle is the controlled electronic device.

9. The method of claim 8, further comprising:
the gesture control device determining whether the minimum absolute difference is less than a predefined tolerance; and
when the minimum absolute difference is less than the predefined tolerance, the gesture control device determining the electronic device corresponding to the second angle in a same direction with the first angle is the controlled electronic device.

10. A gesture control device, the gesture control device communicating with at least two electronic devices, each electronic device being equipped with a camera, the gesture control device comprising:
a storage unit storing instructions; and
a processor configured to execute instructions causing the processor to:
obtain gesture images with depth information from at least two cameras, each camera being positioned at an electronic device;
create a coordinate system which taking depth information as Z axis and coordinates in the plane coordinates system of the gesture images as X axis and Y axis;
determine, in the gesture images, the coordinates of: a center of each camera, a start position and an end position of the gesture;
calculate directions and values of a first angle and at least two second angles, wherein the first angle is an angle from an axle through the end position to a line connecting between the start position and the end position, and each second angle is an angle from a vertical axle through a center of one of the cameras to a line connecting between the center of the one of the cameras and the start position, each second angle corresponding to one of the cameras and an electronic device on which the one of the cameras is located;
determine an electronic device to be a controlled device by the gesture, when the electronic device corresponds to a second angle which has a same direction with the first angle and has a minimum absolute difference with the first angle;
determine whether there is only one second angle in a same direction with the first angle; and
when there is only one second angle in a same direction with the first angle, determine the electronic device corresponding to the second angle in a same direction with the first angle to be the controlled electronic device.

11. The gesture control device of claim 10, wherein the direction of the first angle is based on the coordinates of the start position and the end position on the X axis: when the coordinates of the start position on the X axis is greater than that of the end position, the direction of the first angle is clockwise, while the coordinates of the start position on the X axis is less than that of the end position, the direction of the first angle is anticlockwise.

12. The gesture control device of claim 10, wherein the direction of the first angle is based on the coordinates of the center of each camera and the start position on the X axis: when the coordinates of the start position on the X axis is greater than that of the center of the camera, the direction of the second angle is clockwise, while the coordinates of the start position on the X axis is less than that of the center of the camera, the direction of the second angle is anticlockwise.

13. The gesture control device of claim 10, wherein values of the first angle and the second angles are based on direction vectors of lines defining the first angle and the second angles.

14. The gesture control device of claim 13, wherein when the coordinates of two points are respectively $(x_1, y_1, z_1)$, $(x_2, y_2, z_2)$, the direction vector of a line connecting the two points is $((x_2-x_1), (y_2-y_1), (z_2-z_1))$.

15. The gesture control device of claim 14, wherein when the angle defined by two lines is A, the direction vectors of the two lines are respectively $V_1$, $V_2$, $V_1=(a_1, b_1, c_1)$, $V_2=(a_2, b_2, c_2)$, and the angle A satisfies: $\cos A = V_1 \cdot V_2 / (|V_1|*|V_2|)$.

16. The gesture control device of claim 10, wherein the instructions further cause the processor to:
    calculate an absolute difference between the first angle and the second angle;
    determine whether the calculated absolute difference is less than a predefined tolerance; and
    when the absolute difference is less than the predefined tolerance, determine the electronic device corresponding to the second angle in a same direction with the first angle is the controlled electronic device.

17. The gesture control device of claim 10, wherein the instructions further cause the processor to:
    determine whether there are at least two second angles are in a same direction with the first angle;
    when there are at least two second angles are in a same direction with the first angle, calculate absolute differences between each second angle in a same direction with the first angle and the first angle;
    determine a minimum absolute difference by comparing the calculated absolute differences; and
    determine the electronic device corresponding to the second angle which has the minimum absolute difference with the first angle is the controlled electronic device.

18. The gesture control device of claim 17, wherein the instructions further cause the processor to:
    determine whether the minimum absolute difference is less than a predefined tolerance; and
    when the minimum absolute difference is less than the predefined tolerance, determine the electronic device corresponding to the second angle in a same direction with the first angle is the controlled electronic device.

* * * * *